(12) United States Patent
Feirrell

(10) Patent No.: US 10,731,949 B2
(45) Date of Patent: Aug. 4, 2020

(54) DETACHABLE BALLISTIC SHIELD

(71) Applicant: Charles R. Feirrell, South Bend, IN (US)

(72) Inventor: Charles R. Feirrell, South Bend, IN (US)

( * ) Notice: Subject to any disclaimer, the term of this patent is extended or adjusted under 35 U.S.C. 154(b) by 0 days.

(21) Appl. No.: 16/520,662

(22) Filed: Jul. 24, 2019

(65) Prior Publication Data

US 2020/0041232 A1 Feb. 6, 2020

Related U.S. Application Data

(60) Provisional application No. 62/712,374, filed on Jul. 31, 2018.

(51) Int. Cl.
| | |
|---|---|
| *F41H 5/013* | (2006.01) |
| *F41H 5/08* | (2006.01) |
| *A47B 41/02* | (2006.01) |
| *F41H 5/04* | (2006.01) |

(52) U.S. Cl.
CPC ............. *F41H 5/013* (2013.01); *A47B 41/02* (2013.01); *F41H 5/08* (2013.01); *B32B 2571/02* (2013.01); *F41H 5/0471* (2013.01)

(58) Field of Classification Search
CPC .... F41H 5/0471; F41H 5/0478; F41H 5/0485; F41H 5/08; F41H 5/24; F41H 5/263; F41H 5/013

USPC ........ 89/36.02, 36.05, 36.07, 904, 905, 914, 89/915, 920, 926, 927

See application file for complete search history.

(56) References Cited

U.S. PATENT DOCUMENTS

| | | | | |
|---|---|---|---|---|
| 1,279,571 | A * | 9/1918 | Moloney | F41H 5/08 2/2.5 |
| 6,170,379 | B1 * | 1/2001 | Taylor | F41H 5/08 312/196 |
| 2012/0180636 | A1 * | 7/2012 | Seuk | F41H 5/08 89/36.07 |
| 2012/0248837 | A1 * | 10/2012 | Peters | A47C 3/04 297/239 |
| 2015/0033990 | A1 * | 2/2015 | Yeager | A47B 85/06 108/15 |

* cited by examiner

*Primary Examiner* — Stephen Johnson
(74) *Attorney, Agent, or Firm* — Botkin & Hall, LLP

(57) ABSTRACT

A removable ballistic desk top is mated to a desk frame and can be removed in the event of an active shooter situation. The desk top has a top layer, a fabric layer, and a bottom layer. The fabric layer is a woven mesh and is bonded between the top and bottom layer. The desk top has a beveled edge that provides additional deflection of any projectiles when the beveled edge is placed near the floor. The desk top further includes handles and releasable latches for easy removal and installation to the desk frame.

7 Claims, 5 Drawing Sheets

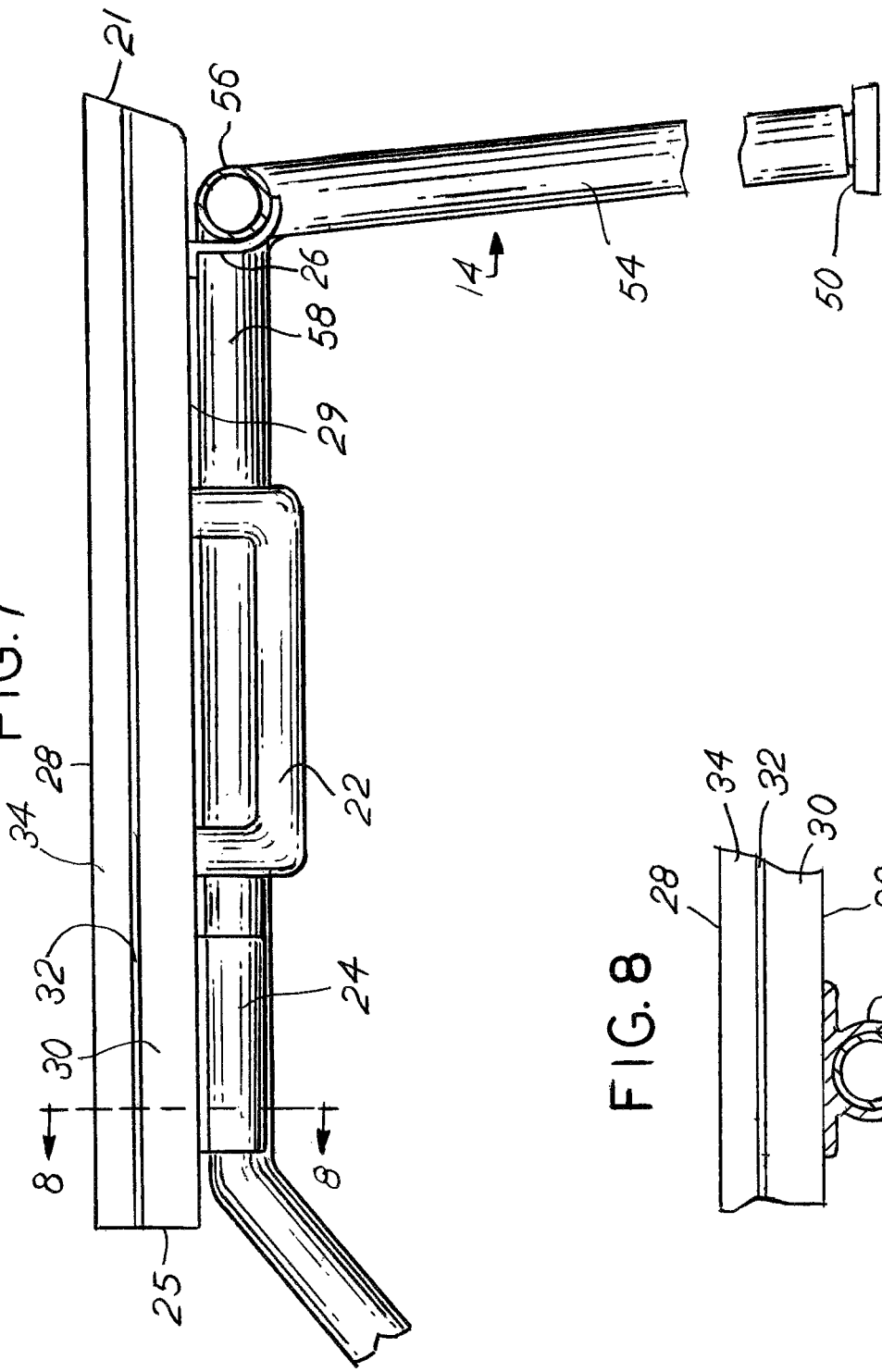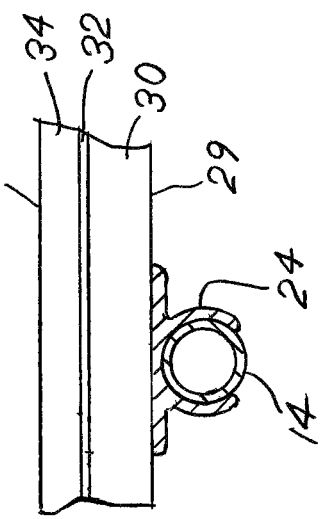

DETACHABLE BALLISTIC SHIELD

CROSS REFERENCE TO RELATED APPLICATIONS

This application claims the benefit of U.S. Provisional Application No. 62/712,374, filed Jul. 31, 2018, the disclosures of which are hereby incorporated by reference.

BACKGROUND OF THE INVENTION

With the rise of domestic terrorism in the form of school shootings, people are trying to protect children in many forms. Some are installing special locks or restricting access to schools and others are further restricting access to individual rooms inside the school building. Some schools have installed metal detectors and have hired security guards. Even with all of these existing protections implemented, very little empowerment has been given to the individual student to protect him or herself in the event of an active shooter situation. An improved device is needed.

SUMMARY OF THE INVENTION

The present disclosure describes a removable ballistic shield that normally functions as a desk top. The shield may be retrofitted to an existing desk or be manufactured as part of a new desk. The desk top is a planar structure that remains attached to the desk frame, but can be removed by releasing the latches that retains the top to the frame. The planar structure is a laminated ballistic structure with different layers performing different but complimentary functions to stop, deflect, or slow any ballistic projectiles. The top has a top surface that will face away from the user when used as a ballistic shield and has a bottom surface where handles or other components may attach to provide the user handles or other features that allow the user to hold, carry, and move the top as they move around.

BRIEF DESCRIPTION OF THE DRAWINGS

FIG. 7 is a partial side view of the top as installed on a desk frame; and

FIG. 8 is a side view of section 8-8 in FIG. 7.

DESCRIPTION OF THE PREFERRED EMBODIMENT

Figure 1:
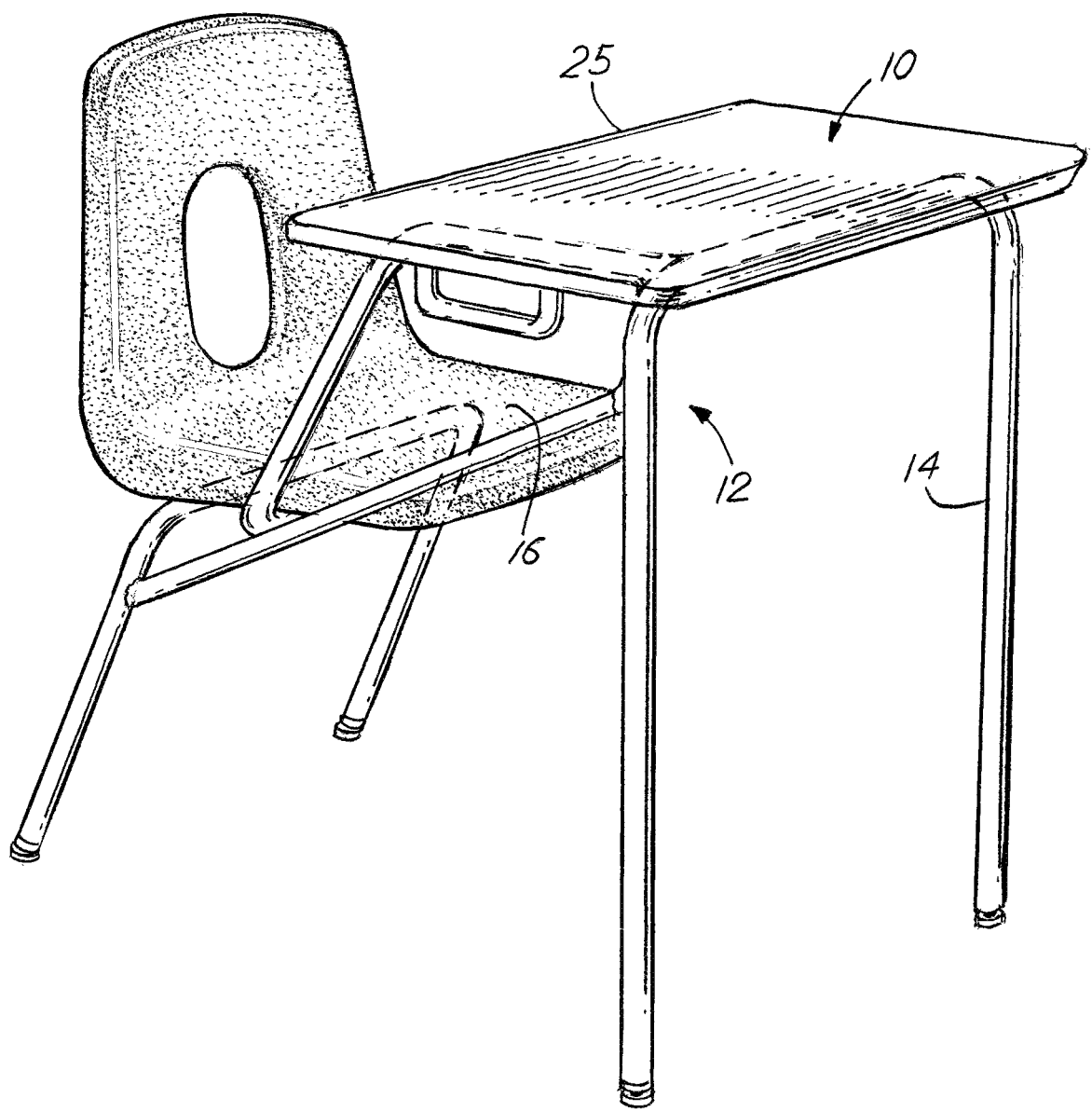
FIG. 1 is a perspective view of a desk having a removable ballistic top.
Figure 2:
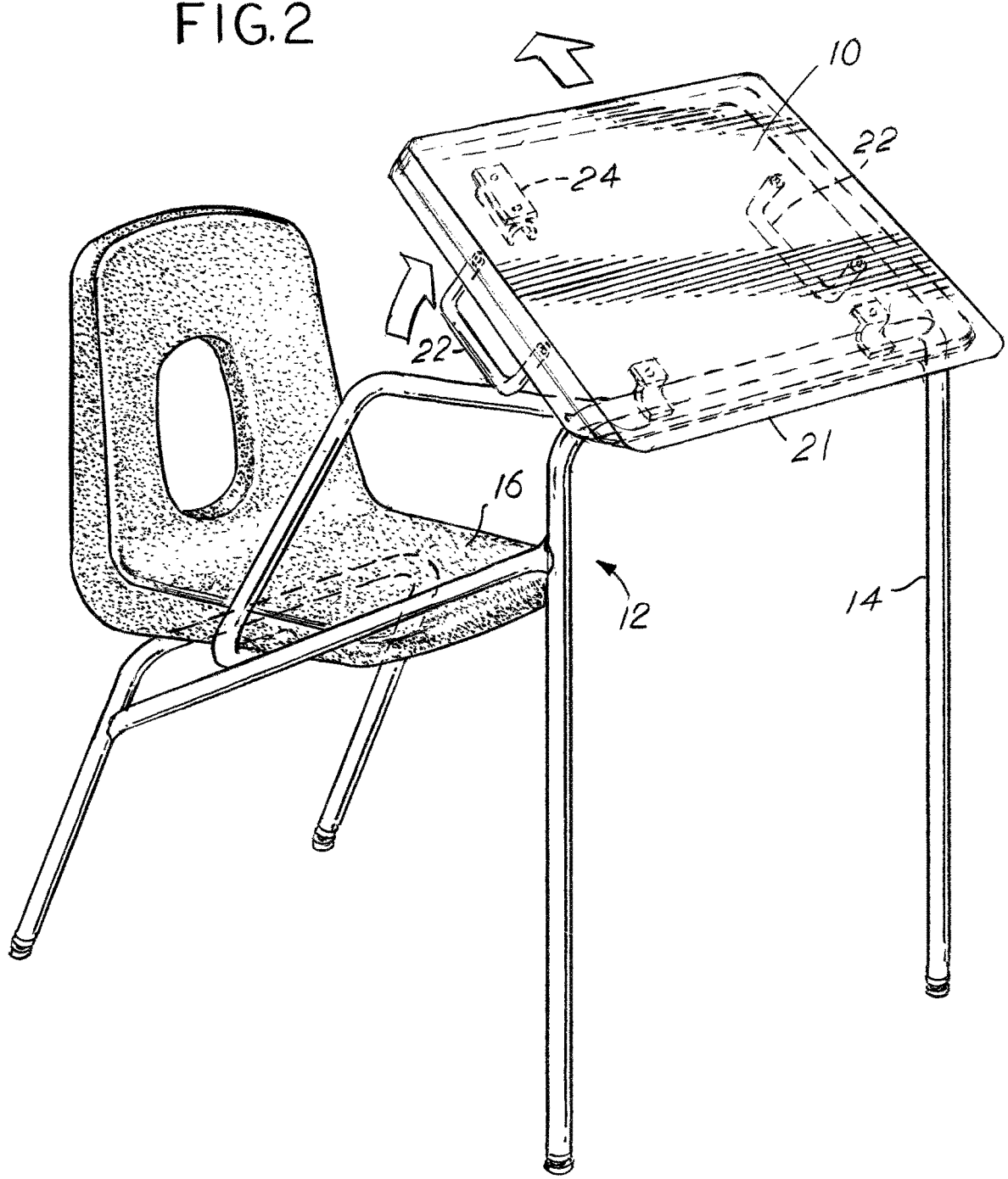
FIG. 2 is a perspective view of the desk as shown in FIG. 1, with the ballistic top partially unlatched from the desk frame.
Figure 3:
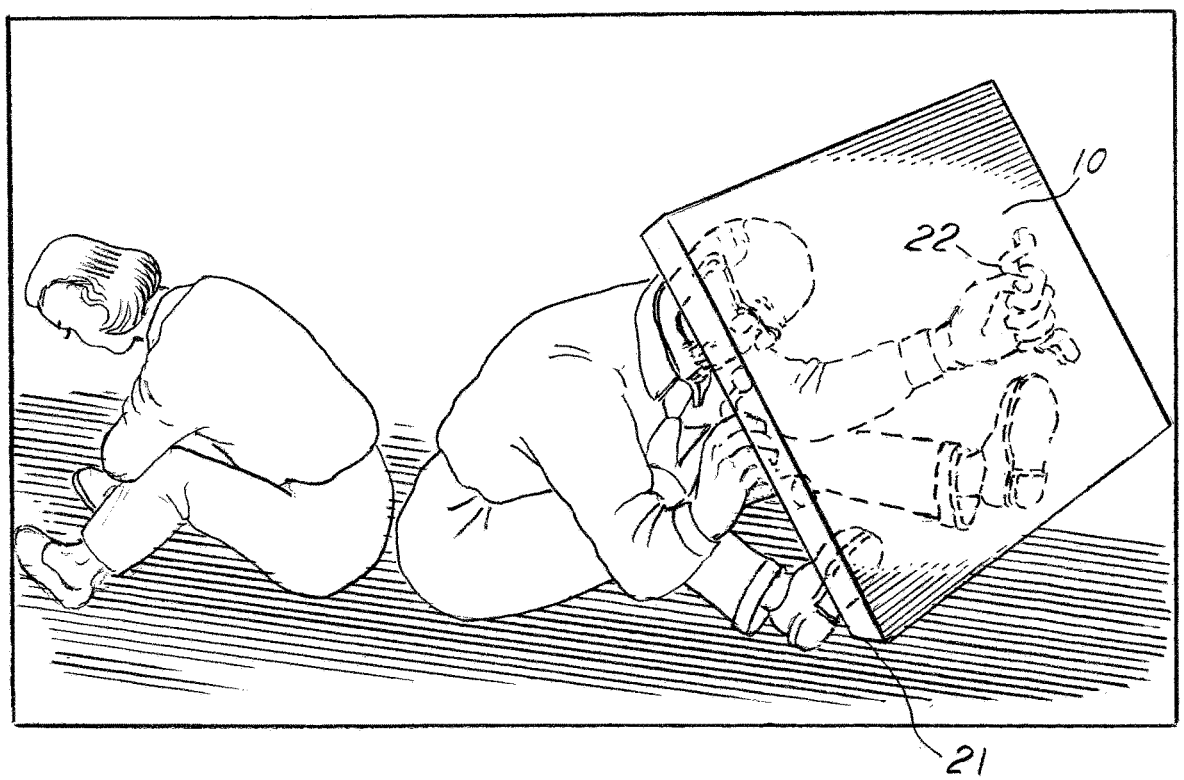
FIG. 3 is a perspective view of the top in use as a ballistic shield being held by one person and shielding another.
Figure 4:
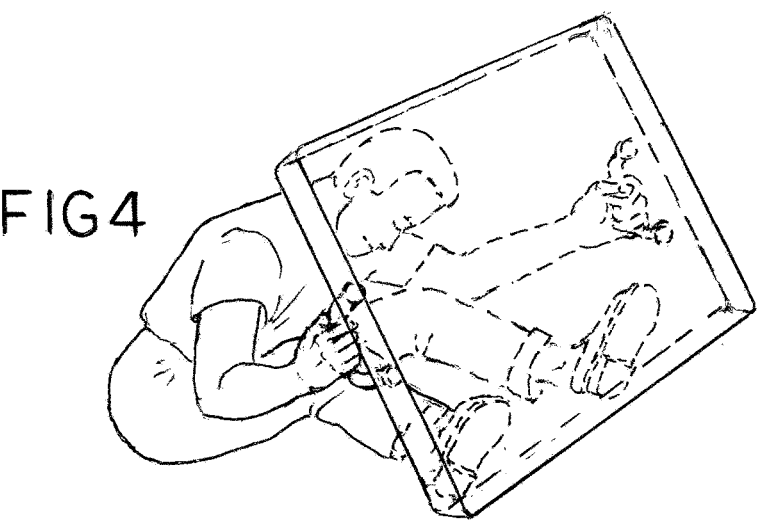
FIG. 4 is a perspective view of the top shielding a user.

A removable ballistic desk top 10, shown in FIG. 1 as attached to a student desk 12. Student desks 12 vary in size and shape, but all have a desk top. The student desk 12 has a frame 14. The student desk 12 will sometimes have an attached seat 16 as shown in FIGS. 1 and 2. Some student desks 12 have a separate seat 16 but the embodiment shown herein uses an integral seat. It is contemplated that the ballistic desk top 10 is used with a standalone desk and separate chair (not shown). In any case, the frame 14 supports the desk top 10.

Figure 5:
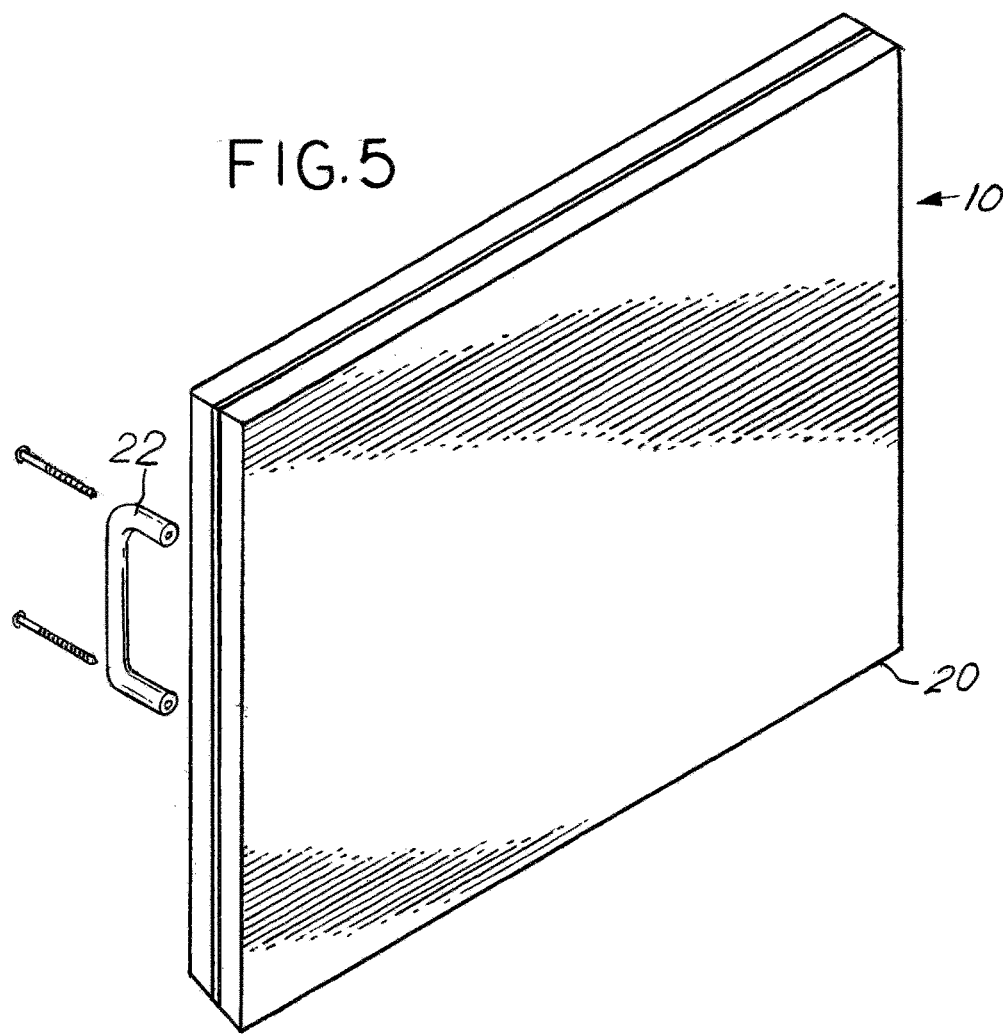
FIG. 5 is a side isometric view of the top.

The ballistic desk top 10 is made from layers of different ballistic materials that are all adhered together to form a laminated ballistic structure. The desk top 10, as shown in the FIGS, is a mostly planar structure, but it is contemplated it includes other features, such as a curved lip, surface contours, or other shape. The desk top 10 shown in FIG. 5 has a leading edge 21 that is obliquely angled with respect to the bottom surface 29. A corner 23 connects the top surface 28 to the leading edge 21. In this configuration, it provides additional deflection and thickness near the floor for when bullets are fired near the floor or from a ricochet. Opposite the leading edge 21 is a student-facing edge 25, which is shown as perpendicular to the top and bottom surfaces 28, 29. The desk top 10 may include other commonly used desktop features, such as grooves that serve as pencil holders or inset trays for assorted items. The desk top 10 has a bottom layer 30 made from a ballistic material, such as ¾" bullet resistant Lexan or ballistic polycarbonate. A layer of woven fabric 32 (commonly aramid fibers, Kevlar, or equivalent thereto) is adhered to the bottom layer 30. The fabric layer 32 can be printed with a school logo, artistic design, instructions, or anything else that the manufacturer desires. It is contemplated that the fabric layer 32 is unprinted and left its natural color. The fabric layer 32 is commonly adhered to the bottom layer 30 through epoxy. Overlaying and bonded to the fabric layer 32 is a top layer 34 of ballistic material, such as 7/16" bullet resistant Lexan or ballistic polycarbonate. The top layer 34 is adhered to the fabric layer 32 through epoxy. It is contemplated that instead of epoxy, another method of joining the layers 30, 32, 34 is used, such as fusing with methylene chloride or sonic welding. It is further contemplated that the fabric layer 32 is integrally formed inside a single sheet of ballistic polycarbonate during extrusion. The polycarbonate layers 30, 34 cooperate with the fabric layer 32 to slow and/or stop any projectiles, bullets, shrapnel, or other high-velocity object. The projectile would impact the top layer 34 first and either be deflected or proceed through the thickness toward the fabric layer 32. If the projectile makes it through the top layer 34, the fabric layer 32 provides a tear and puncture-resistant layer. If the projectile has enough energy to penetrate the top layer 34 and fabric layer 32, the bottom layer 30 provides the last layer of protection. As shown, it is thicker than the top layer 34. If the projectile has enough energy to penetrate the bottom layer 30, a significant portion of the energy from it will be absorbed by the desk top 10.

The frame 14 is commonly made from a series of elongate solid or tubular members that are welded or otherwise affixed to each other for strength and rigidity. The frame 14 has feet 50 for contacting the ground with front and rear upstanding members 52, 54 that extend upwardly from the feet 50. Opposite the feet 50 are top members 56, 58 that provide direct support for the desk top 10. The top members 56, 58 may interconnect between the upstanding members 52, 54. Some frame styles interconnect between the upstanding members at the bottom, near the feet 50. Other frame styles, sometimes called a "sled" frame, interconnect the upstanding members 52, 54 with parallel members that act as the foot to contact the floor. Depending on the style of frame 14, the rear upstanding members 52 may be angled, as shown in FIG. 1. In any frame configuration, the desk top 10 may be adapted to be connected thereto by locating mounting points as described below.

The bottom side of the desk top 10 has several components and features that allow it to be attached to the frame 14. The attachment occurs commonly at the top members 56, 58. The desk top 10 also includes handles 22 that allows it to be held, handled, and moved around when separated from the frame 14. The handles 22 are secured to the desk top 10 through fasteners. The fasteners are either threaded or embedded into the desk top 10 or they are bolted through the thicknesses of the layers 30, 32, 34. In this case, the heads of the fasteners would be countersunk or otherwise flush with the desk top surface 28. Otherwise, the fasteners would interfere with normal writing and desk functions. Quick releases 24 and hooks 26 are securely attached to the desk top 10, commonly through fasteners that are either threaded into or embedded in the desk top 10.

Figure 6:
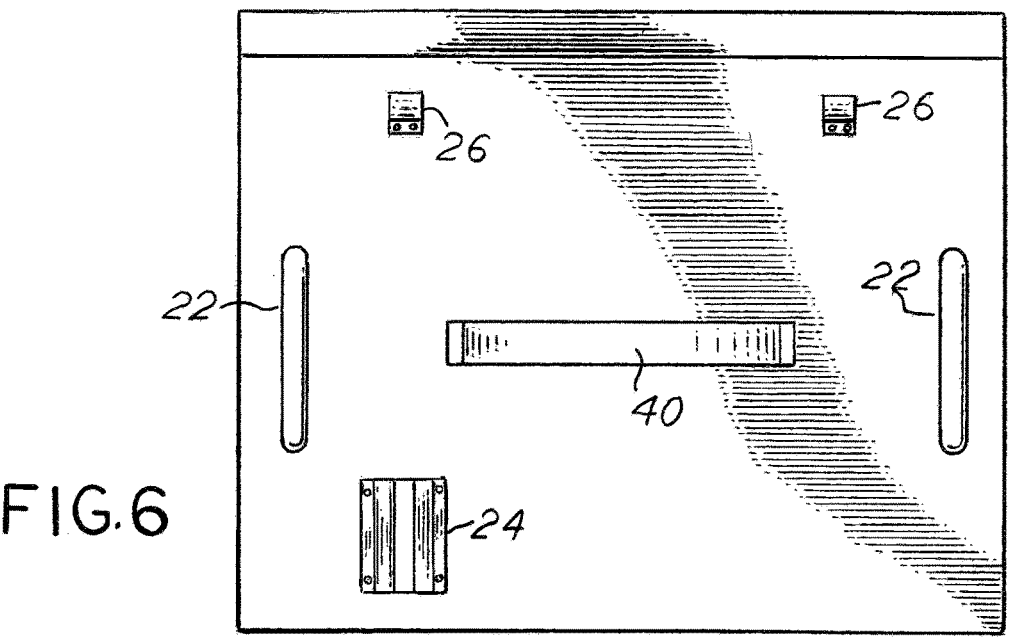
FIG. 6 is a bottom view of the top.

The quick release 24 is unlatched from the frame 14 using only a sharp upward press or movement from the user on the bottom surface 29. Because an active shooter situation involves adrenaline and time is of the essence, the quick release 24 is a "C" shaped deformable catch that partially encircles the frame 14 with arcuate portions. No release handles, levers, or moving parts are required to disconnect the top 10 from the frame 14. A section view is shown in FIG. 6 of the quick release 24 attached to the frame 14. A sharp upward movement disengages the quick release 24 from the frame 14. As shown, the hook 26 is one-sided and allows the student or user to pull the top 10 towards themselves and upward to decouple the hook from the frame 14. It is contemplated that other release and catch mechanisms are used. A strap 40 provides an additional method to carry or hold the desk top 10 by the user. The strap 40 may be attached and configured to be worn like a backpack strap, cross-body strap, or flexible handle.

To reconnect the desk top 10 to the frame, the hooks 26 are located to the frame 14 (top member 56 in FIG. 7) and the quick release 24 is aligned over the top member 58. A downward press on the top surface 28 snaps the quick release 24 over the top member. No tools, locks, or keys are necessary.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A quick release ballistic shield for being removably attached to a desk, said desk having a frame, said shield comprising:

a laminated ballistic structure having a top surface and an oppositely located bottom surface, said ballistic structure formed from a plurality of bonded layers located between said top and bottom surfaces, a first said bonded layer having a first thickness and formed from transparent ballistic polycarbonate, a second said bonded layer adhered to said first layer and having a second thickness and formed from woven aramid fibers, a third said bonded layer adhered to said second bonded layer and having a third thickness and formed from ballistic polycarbonate;

said laminated ballistic structure having an angled leading edge for contacting a floor when said ballistic shield is removed from said desk;

a one-sided hook affixed to said bottom surface adjacent said angled leading edge and having an open side facing said angled leading edge, said one-sided hook for engaging said frame; and a quick release affixed to said bottom surface, said quick release having curved portions to releasably affix said laminated ballistic structure to said frame, said curved portions partially surrounding said frame when said quick release is affixed to said frame.

2. The removable ballistic shield of claim 1, further comprising a flexible strap affixed to said bottom surface.

3. The removable ballistic shield of claim 1, further comprising handles affixed to said bottom surface.

4. The removable ballistic shield of claim 1, wherein said second layer is visible from said top surface.

5. The removable ballistic shield of claim 4, wherein said second layer includes printing visible from said top surface.

6. The removable ballistic shield of claim 1, wherein said ballistic structure is detachable from said frame with only sharp upward pressure on said bottom surface near an edge opposite said angled leading edge.

7. The removable ballistic shield of claim 1, wherein said ballistic structure is detachable from said frame with only sharp upward pressure on said bottom surface near said quick release.

* * * * *